(12) United States Patent
Sham (10) Patent No.: US 10,703,418 B2
(45) Date of Patent: Jul. 7, 2020

(54) AUTOMOBILE FRONT UPPER BODY STABLIZER

(71) Applicant: Thunder Power New Energy Vehicle Development Company Limited, Central (HK)

(72) Inventor: Wellen Sham, Taipei (TW)

( * ) Notice: Subject to any disclaimer, the term of this patent is extended or adjusted under 35 U.S.C. 154(b) by 33 days.

(21) Appl. No.: 16/125,909

(22) Filed: Sep. 10, 2018

(65) Prior Publication Data

US 2019/0077463 A1    Mar. 14, 2019

Related U.S. Application Data

(60) Provisional application No. 62/556,759, filed on Sep. 11, 2017.

(51) Int. Cl.
*B62D 25/08*    (2006.01)
*B62D 27/06*    (2006.01)
*B60L 50/50*    (2019.01)

(52) U.S. Cl.
CPC ......... *B62D 25/088* (2013.01); *B62D 27/065* (2013.01); *B60L 50/50* (2019.02)

(58) Field of Classification Search
CPC ... B62D 25/088; B62D 25/081; B62D 25/082
USPC .................. 296/192, 193.02, 203.02, 187.09
See application file for complete search history.

(56) References Cited

U.S. PATENT DOCUMENTS

| | | | |
|---|---|---|---|
| 8,191,958 B2 * | 6/2012 | Tomimatsu | B62D 33/06 296/187.09 |
| 10,144,456 B1 * | 12/2018 | Ciccone | B62D 25/088 |
| 2017/0313360 A1 * | 11/2017 | An | B62D 25/082 |

* cited by examiner

*Primary Examiner* — Pinel E Romain
(74) *Attorney, Agent, or Firm* — Kilpatrick Townsend & Stockton LLP (57) ABSTRACT

Systems and methods are provide for stabilizing the front upper body of an automobile. Some embodiments operate in context of an electric car, or other electric vehicle. For example, the front body of an automobile can include a right front wheelhouse and a left front wheelhouse, coupled with a right front suspension assembly and a left front suspension assembly, respectively. The front body can also include a plenum, which can include a large panel situated behind the vehicle dashboard. A stabilization assembly can include a cross-rail to tie the right and left front wheelhouses together, thereby stabilizing lateral and/or other vibrations across the left and right front suspension assemblies. The stabilization assembly can also include a plenum tie-rail to tie both front wheelhouses to the plenum, which can improve stiffness of the upper plenum and can improve front-impact crash performance.

19 Claims, 7 Drawing Sheets

AUTOMOBILE FRONT UPPER BODY STABLIZER

FIELD

Embodiments relate generally to vehicle body structures, and, more particularly, to front upper body stabilizers for electric automobiles and/or other vehicles.

BACKGROUND OF THE INVENTION

Electric vehicles are becoming an increasingly viable alternative to traditional vehicles with internal combustion engines. Electric vehicles may have advantages in their compactness, simplicity of design, and in being potentially more environmentally friendly depending on the means by which the electricity used in the vehicle was originally generated. The prospect of using renewable energy sources to power automobiles in place of gasoline has obvious advantages as oil reserves across the globe become increasingly depleted.

Vehicle manufacturers continually add new structural features to vehicles to improve safety and/or performance. Many of these structural features are applicable to electric, hybrid, and non-electric vehicles equally, while others are more conducive to use in particular types of vehicles. For example, in a vehicle having a gasoline engine in the front, certain structures for improving performance, safety, and/or other characteristics of the vehicle may also have to accommodate the space, weight, and other characteristics of the engine. In an electric vehicle, corresponding structures may be designed differently, for example, to exploit the absence of the gasoline engine, while accommodating the presence of one or more batteries and electric motors.

BRIEF SUMMARY OF THE INVENTION

Among other things, embodiments provide systems and methods for stabilizing the front upper body of an automobile. Some embodiments operate in context of an electric car, or other electric vehicle. For example, the front body of an automobile can include a right front wheelhouse and a left front wheelhouse, coupled with a right front suspension assembly and a left front suspension assembly, respectively. The front body can also include a plenum, which can include a large panel situated behind the vehicle dashboard. A stabilization assembly can include a cross-rail to tie the right and left front wheelhouses together, thereby stabilizing lateral and/or other vibrations across the left and right front suspension assemblies. The stabilization assembly can also include a plenum tie-rail to tie both front wheelhouses to the plenum, which can improve stiffness of the upper plenum and can improve front-impact crash performance.

In one set of embodiments, a vehicle body is provided having a front portion, a rear portion, and a passenger compartment disposed behind the front portion and in front of the rear portion. The vehicle body includes: a right front wheelhouse coupled with a right front suspension assembly; a left front wheelhouse coupled with a left front suspension assembly; a plenum panel extending laterally across the front portion, disposed behind the right front wheelhouse and the left front wheelhouse, and disposed in front of the passenger compartment; and a stabilization assembly. The stabilization assembly includes: a cross-rail coupled with the right front wheelhouse and the left front wheelhouse to transfer loads between the right front suspension assembly and the left front suspension assembly; and a plenum tie-rail coupled with the right front wheelhouse, the left front wheelhouse, and the plenum panel to transfer loads between the plenum panel, the right front wheelhouse, and the left front wheelhouse.

In another set of embodiments, a stabilization assembly for a body structure of a vehicle is provided. The stabilization assembly includes a cross-rail and a plenum tie-rail. The cross-rail includes: a first attachment structure to couple with a right front wheelhouse of the body structure; a second attachment structure to couple with a left front wheelhouse of the body structure; and a first rail member extending between the first attachment structure and the second attachment structure to transfer loads between the right front wheelhouse and the left front wheelhouse. The plenum tie-rail includes: a third attachment structure to couple with the right front wheelhouse; a fourth attachment structure to couple with the left front wheelhouse; a fifth attachment structure to couple with a plenum panel of the body structure; and a second rail member extending between the third attachment structure and the fourth attachment structure, via the fifth attachment structure, to transfer loads between the plenum panel, the right front wheelhouse, and the left front wheelhouse.

In another set of embodiments, a method for stabilization in a vehicle body structure is provided. The method includes: coupling a cross-rail with a right front wheelhouse of the body structure at a first coupling location; coupling the cross-rail with a left front wheelhouse of the body structure at a second coupling location; coupling a plenum tie-rail with the right front wheelhouse of the body structure substantially at a third coupling location; coupling the plenum tie-rail with the left front wheelhouse of the body structure substantially at a fourth coupling location; and coupling the plenum tie-rail with an upper rail of a plenum panel of the body structure, such that the cross-rail transfers transient loads between the right front wheelhouse and the left front wheelhouse, and the plenum tie-rail transfers transient loads between the plenum panel, the right front wheelhouse, and the left front wheelhouse.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
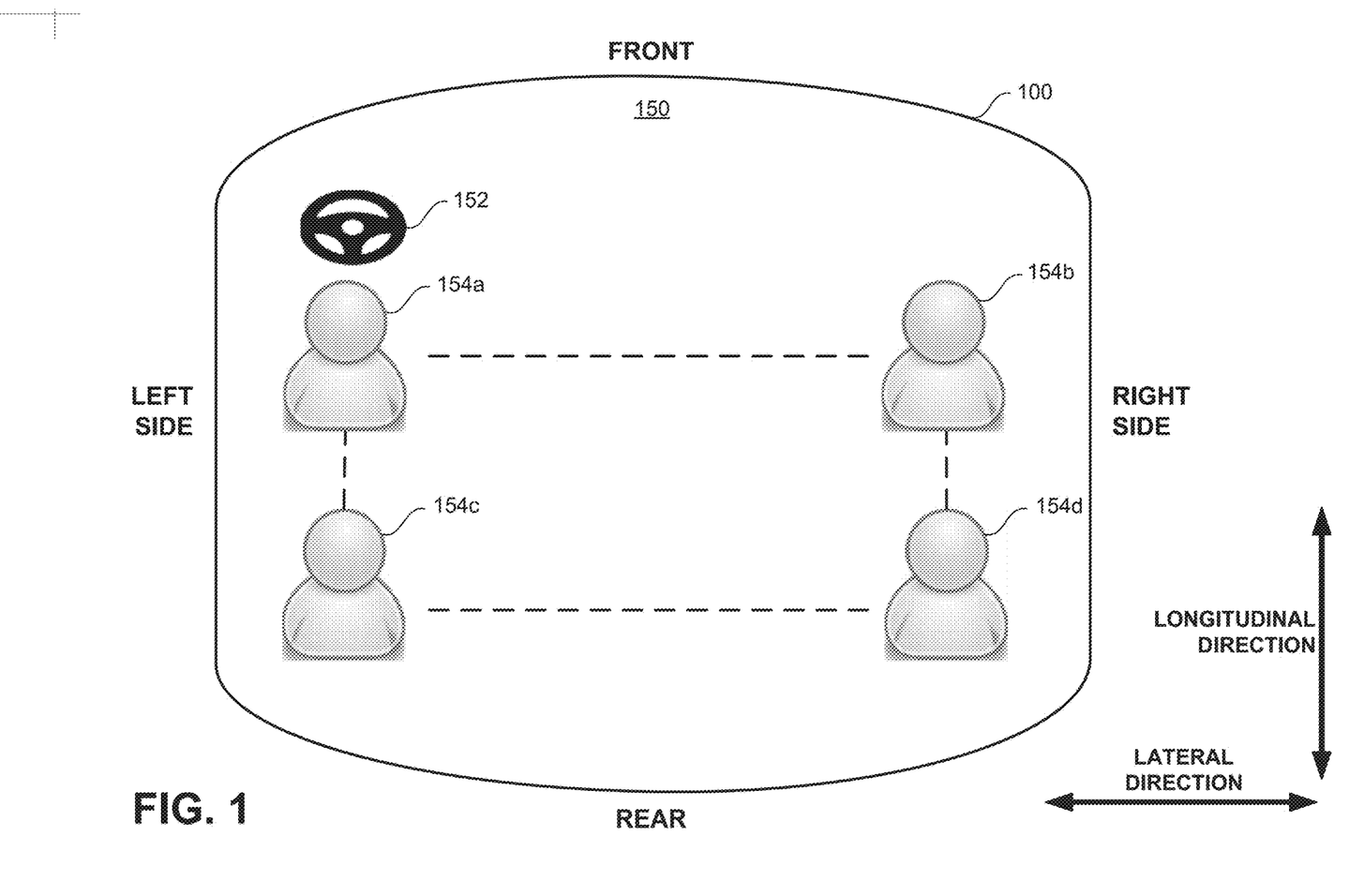
FIG. 1 shows a generalized vehicle, as a context for various embodiments.

FIG. 1 shows a generalized vehicle 100, as a context for various embodiments. The vehicle 100 can include any suitable type of a vehicle, such as a car, a bus, a train, a truck, or a tram; any type of a vessel, such as a boat, a ship, a barge, a ferry, or any type of watercraft; any type of an aircraft, such as an airplane, a helicopter, or a spaceship; or any other transportation apparatus. In some embodiments, vehicle 100 is an electrical automobile. In other embodiments, the vehicle 100 may be powered by any suitable fuel other than electricity, and/or the vehicle 100 may be powered by a hybrid of multiple types of fuel (e.g., electricity and gasoline).

Embodiments of the vehicle 100 can be driven by a human driver, by an autonomous driving system (e.g., driverless), and/or by a combination of a human driver with automated assistance. Some implementations of the vehicle 100 include a cabin 150 (also referred to herein as "passenger compartment," or the like) with a volume in which one or more passengers 154 can ride. As used herein, the term "passenger" 154 broadly includes any occupant of the vehicle 100, including a driver or non-driving passenger. In implementations of the vehicle 100 that include a driver, the vehicle 100 can include one or more steering wheels 152, and/or any other suitable control interfaces, in the cabin 150. As illustrated, one or more passengers 154 can be arranged to occupy corresponding positions in the cabin 150. For example, one passenger 154a can be a driver who controls movement or navigation of vehicle 100 via the steering wheel 152, while other passengers 154b-154d are non-driving occupants of the vehicle 100.

For the sake of adding clarity to the descriptions herein, FIG. 1 defines a directional context. As illustrated, relative positions of front, rear, left side, and right side are defined herein from a top-down perspective of the vehicle 100 assuming normal forward motion. Similarly, the longitudinal direction is defined with reference to the front and rear positions in the vehicle 100; and the lateral direction is defined with reference to the left side and right side positions in the vehicle 100. For example, a component that extends laterally in the vehicle 100 refers herein to a component that extends some or all of the way across the vehicle 100 between the right side and the left side.

Generally, a vehicle 100 includes a structural body at least partially covered by a vehicle chassis, and a large number of components installed in one or bother of the vehicle body and chassis. The vehicle body generally includes the various internal structures that provide strength, stability, and other such characteristics to the vehicle 100, and that support components, such as engines and/or motors, batteries and/or fuel tanks, suspensions, transmissions, axles, seats, doors, etc. The vehicle chassis generally includes the various external structures that provide aerodynamics, aesthetics, and other such characteristics to the vehicle 100.

Systems and methods described herein relate generally to improvements for the structural bodies of vehicles. Designing the body of a vehicle can involve a number of tradeoffs between various considerations and objectives, including weight, strength, stability, comfort, safety, and others. For example, reducing the weight of a vehicle body may contribute toward improved pickup and fuel efficiency, but may also contribute toward less traction and less safety. Similarly, stiffening a vehicle body may add stability during cornering and protection for vehicle components and occupants; but may also add weight, reduce pickup, add vibration, etc. Various designs can also depend on the overall shape and size of the vehicle 100, which types of components are installed in the vehicle 100, etc. For example, in a typical gasoline-powered automobile, the engine consumes a large amount of space and weight in the front of the vehicle 100, which appreciably impacts the design of the front body of the vehicle 100; while in some electric vehicles, absence of a large engine in the front of the vehicle 100 can provide a different set of design opportunities and impacts (e.g., more space, less weight, etc.).

Figure 2:
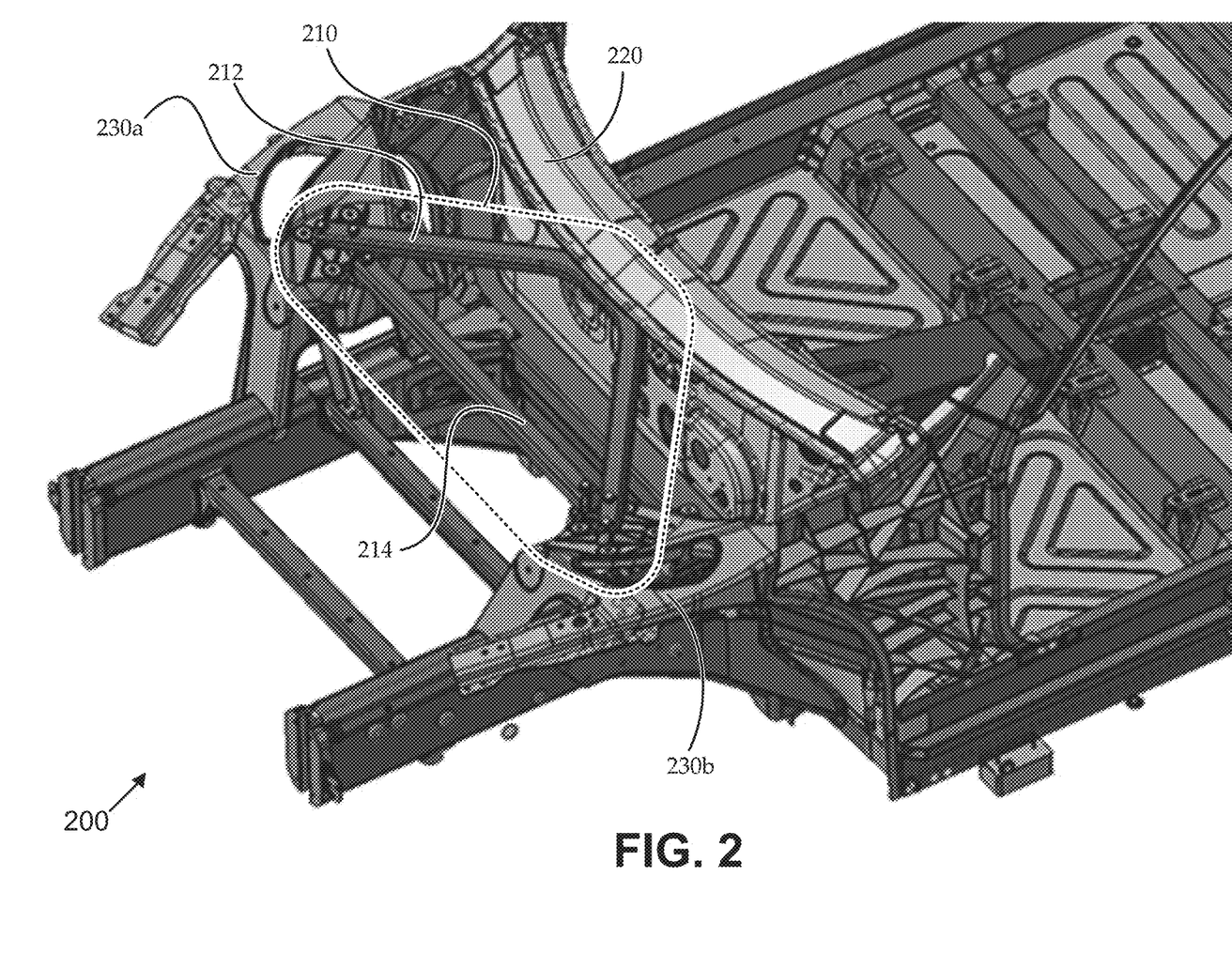
FIG. 2 shows a portion of an illustrative vehicle body, according to various embodiments.

FIG. 2 shows a portion of an illustrative vehicle body 200, according to various embodiments. The vehicle body 200 can be a portion of the main structural body of the vehicle 100 of FIG. 1. Various components of the vehicle body 200 are not shown to avoid overcomplicating the figure and obscuring the inventive features. While the illustrated vehicle body 200 is that of an electric automobile, embodiments discussed herein can be applied to any suitable vehicle body, regardless of whether the vehicle body 200 is in an electric vehicle and/or whether the vehicle body 200 is in an automobile. For example, various configurations of cars, buses, trains, trucks, trams, watercraft, aircraft, and/or other types of vehicles can be designed with sufficient space in a front vehicle body to exploit embodiments described herein.

As used herein, the vehicle body 200 generally includes three portions: a front body, a rear body, and a passenger compartment (or cabin). Though precise differentiation between these portions is not critical, it is helpful for the discussion herein to consider that a plenum panel 220 effectively forms the boundary between the front body portion and the passenger compartment portion. As such, the front body of the vehicle can be considered as the entire portion of the vehicle body 200 extending longitudinally from the plenum panel 220 forward. The plenum panel 220 can be a large panel (e.g., made of aluminum, or any other suitable material) that forms a structural backing to (e.g., is directly in front of) the dashboard of the passenger compartment. For example, the plenum panel 220 can support a steering column, dashboard indicators, etc. As illustrated, an upper portion of the plenum panel 220 can include a curved rail, or the like. Conventionally, certain front-body forces, such as vibration forces from the front wheels and suspension and/or front-impact crash forces, can be transferred into the passenger compartment (e.g., felt by the driver) via the plenum panel 220. Embodiments herein describe systems and methods for improving structural performance of the front body portion of the vehicle body 200. For example, the embodiments seek to transfer front-impact crash loads and vibration loads away from the plenum panel 220 (and thereby away from the passenger compartment) to other components of the vehicle body 200, and/or to distribute lateral vibration loads (e.g., from wheels and suspension assemblies) across the sides of the vehicle body 200.

As illustrated, the vehicle body 200 (more specifically, the front body portion of the vehicle body 200) includes a right front wheelhouse 230a and a left front wheelhouse 230b. Though not shown, the right front wheelhouse 230a is designed to be coupled with a right front suspension assembly and to provide a structural housing for a right front wheel; and the left front wheelhouse 230b is designed to be coupled with a left front suspension assembly and to provide a structural housing for a left front wheel. As described above, a plenum panel 220 extends laterally across the front body portion of the vehicle body 200, disposed behind the right front wheelhouse 230a and the left front wheelhouse 230b, and disposed in front of the passenger compartment portion of the vehicle body 200.

The vehicle body 200 also includes a stabilization assembly 210. The illustrated vehicle body 200 can be designed for an electric vehicle having one or more batteries mounted on the underside of the passenger compartment section of the vehicle body 200. The batteries are used to power one or more electric motors positioned near the wheel axles. In such a configuration, the front body section of the vehicle body 200 can include appreciably more available area for certain structures than in a conventional gasoline-powered automobile. For example, in a conventional gasoline-powered automobile, the front body is typically designed around a large internal combustion engine, a longitudinal drivetrain (e.g., typically extending along much of the length of the vehicle), and other supporting components (e.g., fuel system components, transmission components, etc.). Absence of such components in the front body portion of the vehicle body 200 can provide ample space in which to implement the stabilization assembly 210. For example, in a conventional gasoline-powered automobile, the large internal combustion engine may occupy the same space as occupied in FIG. 2 by the stabilization assembly 210.

Embodiments of the stabilization assembly 210 include a cross-rail 214 and a plenum tie-rail 212. Embodiments of the cross-rail 214 are coupled with the right front wheelhouse 230a and the left front wheelhouse 230b. The cross-rail 214 can effectively form a cross-brigade to transfer loads between the right front suspension assembly and the left front suspension assembly. Embodiments of the plenum tie-rail 212 are coupled with the right front wheelhouse 230a, the left front wheelhouse 230b, and the plenum panel 220. The plenum tie-rail 212 can effectively provide increased stiffness to the upper portion of the plenum panel 220, and can transfer various transient loads between the plenum panel 220, the right front wheelhouse 230a, and the left front wheelhouse 230b.

In some embodiments, the plenum tie-rail 212 and cross-rail 214 are made of aluminum. In other embodiments, the cross-rail 214 and/or plenum tie-rail 212 are made of alloys containing aluminum. In other embodiments, other materials are used. Aluminum and aluminum alloys can provide strong, lightweight components. Shapes and materials of the various structures, including those of the stabilization assembly 210 can be designed to consider various factors, such as desired rigidity of the vehicle, desired absorption and/or distribution of energy from a collision and/or other transient forces, etc.

Though shown as two separate components, the stabilization assembly 210 can be implemented as more or fewer components. In one embodiment, the plenum tie-rail 212 and the cross-rail 214 are a single unitary component. For example, a single piece of aluminum can be shaped to form the entire stabilization assembly 210 (i.e., having portions corresponding to the plenum tie-rail 212 and the cross-rail 214), or a separately formed plenum tie-rail 212 and cross-rail 214 can be welded (or otherwise coupled) together into a unitary structure. In another embodiment, the plenum tie-rail 212 can be formed from multiple components, which may or may not be coupled together. For example, a first rail of the plenum tie-rail 212 can be coupled between the plenum panel 220 and the right front wheelhouse 230a, and a second rail of the plenum tie-rail 212 can be coupled between the plenum panel 220 and the left front wheelhouse 230b. In such an example, the first and second rails may or may not be coupled with each other, may or may not be in contact with each other (e.g., they may be coupled to separate locations on the plenum panel 220), and/or may or may not be coupled via a third rail extending along the plenum panel 220.

In some embodiments, the plenum tie-rail 212 includes a first portion extending linearly along a first vector between the plenum panel 220 and the right front wheelhouse 230a, and a second portion extending linearly along a second vector between the plenum panel and the left front wheelhouse 230b, so that the first and second vectors forming an angle. The cross-rail 214 extends linearly from the right front wheelhouse 230a to the left front wheelhouse 230b. In such an embodiment, the plenum tie-rail 212 and the cross-rail 214 form a substantially triangular structure between the plenum panel 220, the right front wheelhouse 230a, and the left front wheelhouse 230b. In some such embodiments, the plenum tie-rail 212 further includes a third portion coupled between the first portion and the second portion and extending linearly along an upper ridge of the plenum panel 220, such that the plenum tie-rail 212 and the cross-rail 214 form a substantially trapezoidal structure between the plenum panel 220, the right front wheelhouse 230a, and the left front wheelhouse 230b. In other embodiments, the plenum tie-rail 212 includes a first portion extending along a first curved path between the plenum panel 220 and the right front wheelhouse 230a, and a second portion extending along a second curved path between the plenum panel 220 and the left front wheelhouse 230b. The cross-rail extends linearly from the right front wheelhouse 230a to the left front wheelhouse 230b. In such an embodiment, the plenum tie-rail 212 and the cross-rail 214 form a substantially D-shaped structure between the plenum panel 220, the right front wheelhouse 230a, and the left front wheelhouse 230b.

Figure 3:
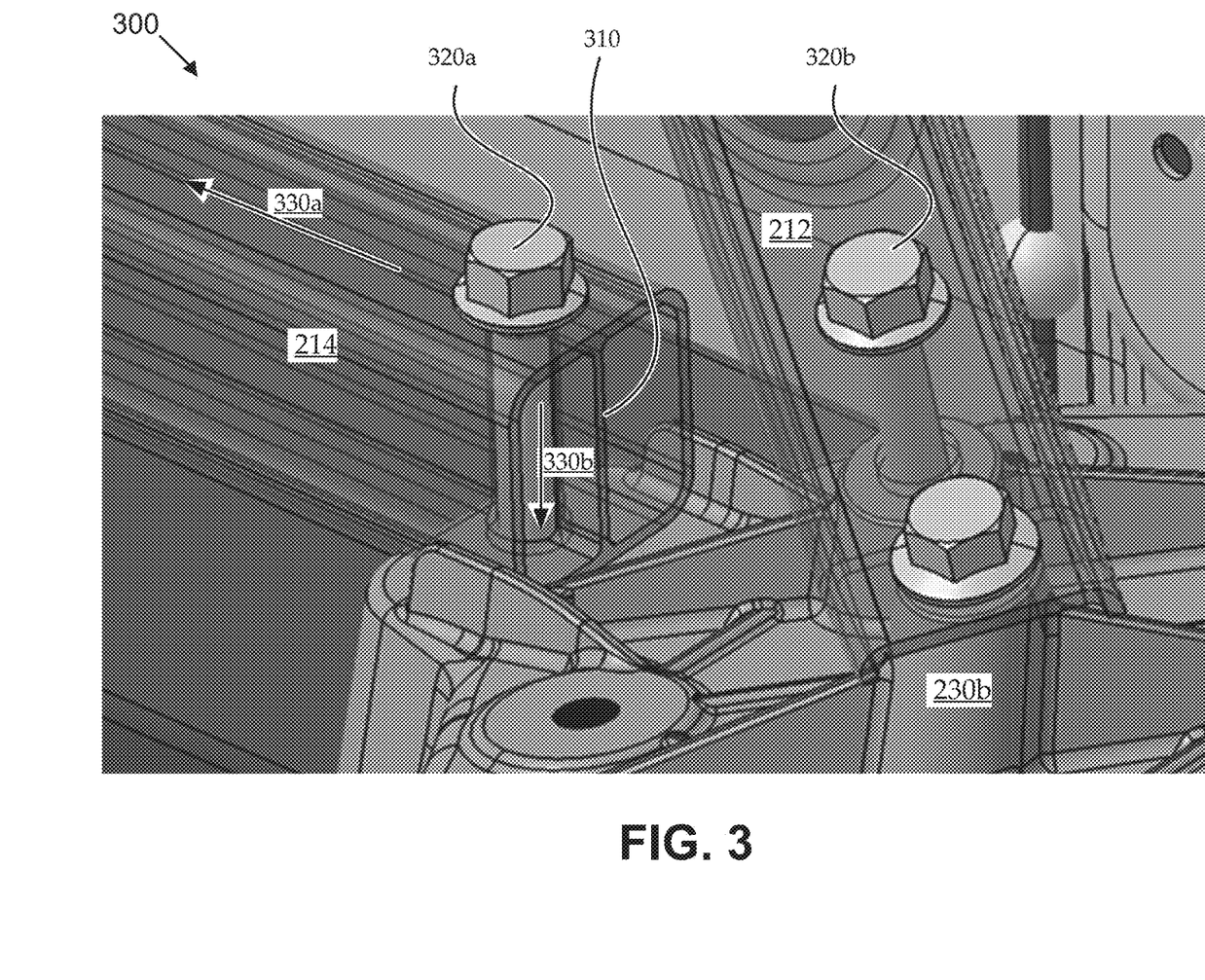
FIG. 3 shows structural detail for a portion of an illustrative stabilization assembly in an illustrative partial vehicle body context, according to various embodiments.

FIG. 3 shows structural detail for a portion of an illustrative stabilization assembly 210 in an illustrative partial vehicle body context 300, according to various embodiments. The illustrated stabilization assembly 210 includes a separate plenum tie-rail 212 and cross-rail 214. The illustrated portion of the plenum tie-rail 212 is shown coupled with the left front wheelhouse 230b using two attachment structures 320, and the illustrated portion of the cross-rail 214 is shown coupled with the left front wheelhouse 230b using one attachment structure 320. The attachment structures can be implemented as any suitable mechanical fastener, such as a bolt, screw, pin, clamp, etc.

Embodiments of the left front wheelhouse 230b are designed with certain features to receive the plenum tie-rail 212 and the cross-rail 214. For example, as illustrated, the left front wheelhouse 230b can include holes to receive attachment structures 320, stiffeners to help transfer and/or absorb transient forces via the plenum tie-rail 212 and cross-rail 214, etc. Though only the left front wheelhouse 230b, embodiments of the right front wheelhouse 230a can be implemented to provide the same, or corresponding, features for interfacing with the right sides of the plenum tie-rail 212 and cross-rail 214. For example, one embodiment of the right front wheelhouse 230a is designed as a mirror image of its left front wheelhouse 230b counterpart.

In some embodiment, as shown, the cross-rail 214 can include a rib 310 extending in a first direction 330a along a central axis of the cross-rail 214 and defining a rib plane. A first attachment structure 320a extends through the cross-rail 214 along the rib plane in a second direction 330b orthogonal to the first direction 330a. The first attachment structure 330a couples the cross-rail 214 to the left front wheelhouse 230b. In some implementations, the rib 310 extends the entire length of the cross-rail 214, and a corresponding arrangement is used to couple the cross-rail 214 to the right front wheelhouse 230a. In some implementations, the rib 310 is only in certain sections of the cross-rail 214. In other implementations, other types of reinforcement structures are included in the cross-rail 214 instead of, or in addition to, the rib 310; and/or some or all of the cross-rail 214 is solid.

Figure 4:
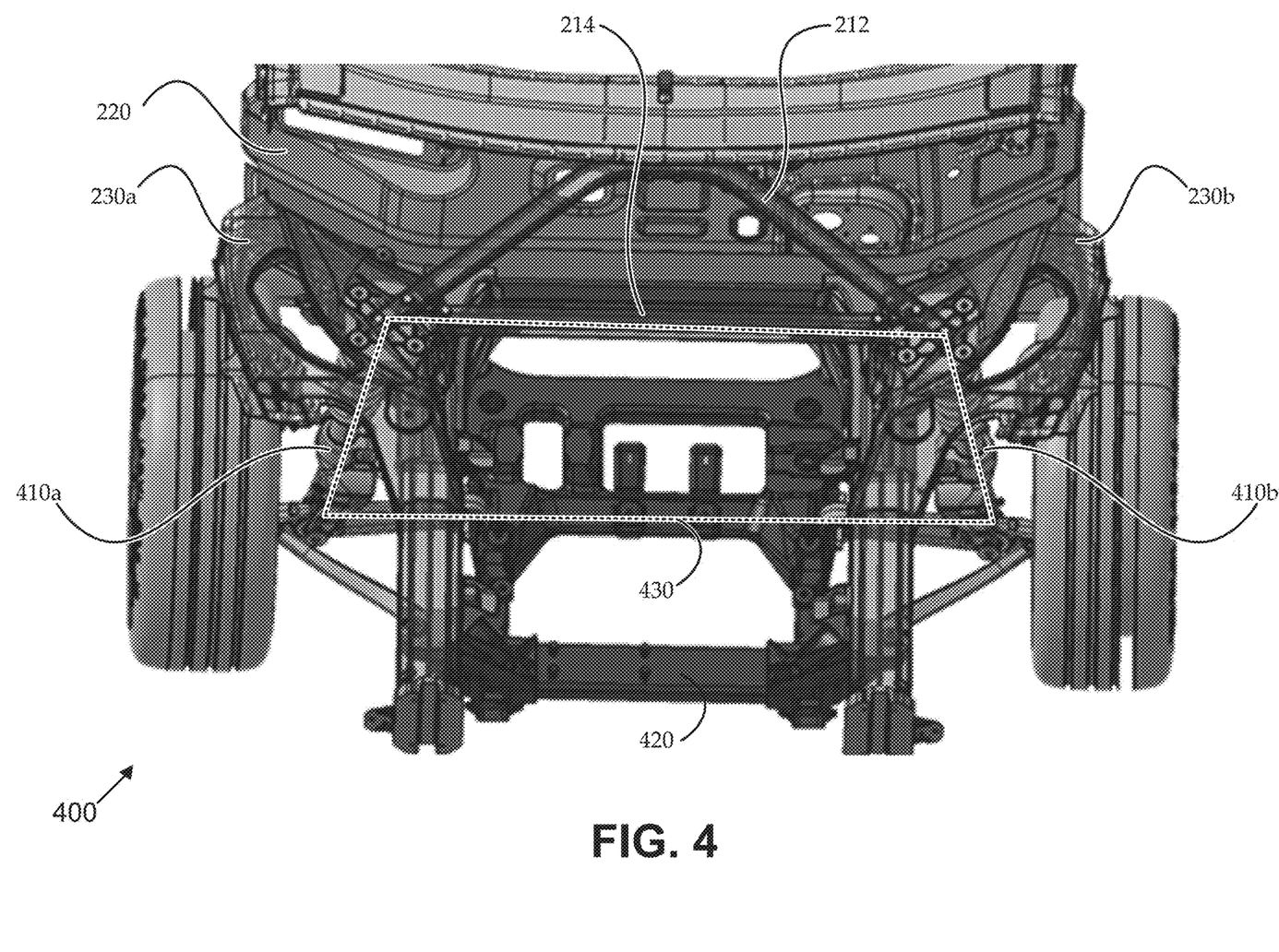
FIG. 4 shows a front view of an illustrative front body structural context to demonstrate various features of embodiments described herein.

FIG. 4 shows a front view of an illustrative front body structural context 400 to demonstrate various features of embodiments described herein. As described above, the front body structural context 400 includes a stabilization assembly 210 (a plenum tie-rail 212 and a cross-rail 214), a plenum panel 220, a right front wheelhouse 230a, and a left front wheelhouse 230b. The illustrated front body structural context 400 also includes a front underbody structure 420. The illustrated front body structural context 400 also includes a right front suspension assembly 410a, and a left front suspension assembly 410b, each coupled with a respective front wheel.

Each of the right front suspension assembly 410a and the left front suspension assembly 410b generally includes a respective upper mount, a respective lower mount, and a respective strut. Each respective lower mount can be coupled with a respective front wheel via one or more structures (e.g., one or more knuckles, bushings, ball joints, arms, etc.). Each respective upper mount is coupled with a respective front wheelhouse 230. Each respective strut can be part of an assembly that can include coil springs, strut mounts, dust boots, and/or any other suitable components. In general, forces (e.g., vibration forces from contact between the wheel and the road, from gravitational and/or other forces acting on the vehicle, etc.) are transferred from the front wheels to the front suspension assemblies 410 via the lower mounts, and through the front suspension assemblies 410 to the front wheelhouses 230 via the struts and upper mounts.

As illustrated, some of the loads (e.g., vibrations and/or other transient loads) transferred to the lower mounts of the front suspension assemblies 410 can be distributed laterally across the front underbody structure 420. The cross-rail 214 can effectively form a cross-brigade to couple the right front wheelhouse 230a and the left front wheelhouse 230b. As such, some of the loads transferred through the upper mounts of the front suspension assemblies 410 into the front wheelhouses 230 can be distributed laterally across the cross-rail 214. In effect, the distribution of front suspension loads across the cross-rail 214 can define an upper load path, the distribution of front suspension loads across the front underbody structure 420 can define a lower load path, the right front suspension assembly 410a (e.g., the right strut) can define a right load path, and the left front suspension assembly 410b (e.g., the left strut) can define a left load path.

The upper, lower, right, and left load paths can effectively form sides of a load trapezoid 430. For example, the upper and lower load paths can form two substantially parallel sides of the load trapezoid 430, and the right and left load paths can form the other two sides of the load trapezoid 430. In some vehicle configurations, a majority of lateral vibrations transferred from the front wheels into the front suspension assemblies 410 are further transferred to this load trapezoid 430. As such, tying the front wheelhouses 230 together via the cross-rail 214 can effectively form a closed load trapezoid 430, which can add appreciable stability and resistance with respect to such lateral vibrations.

Figure 5:
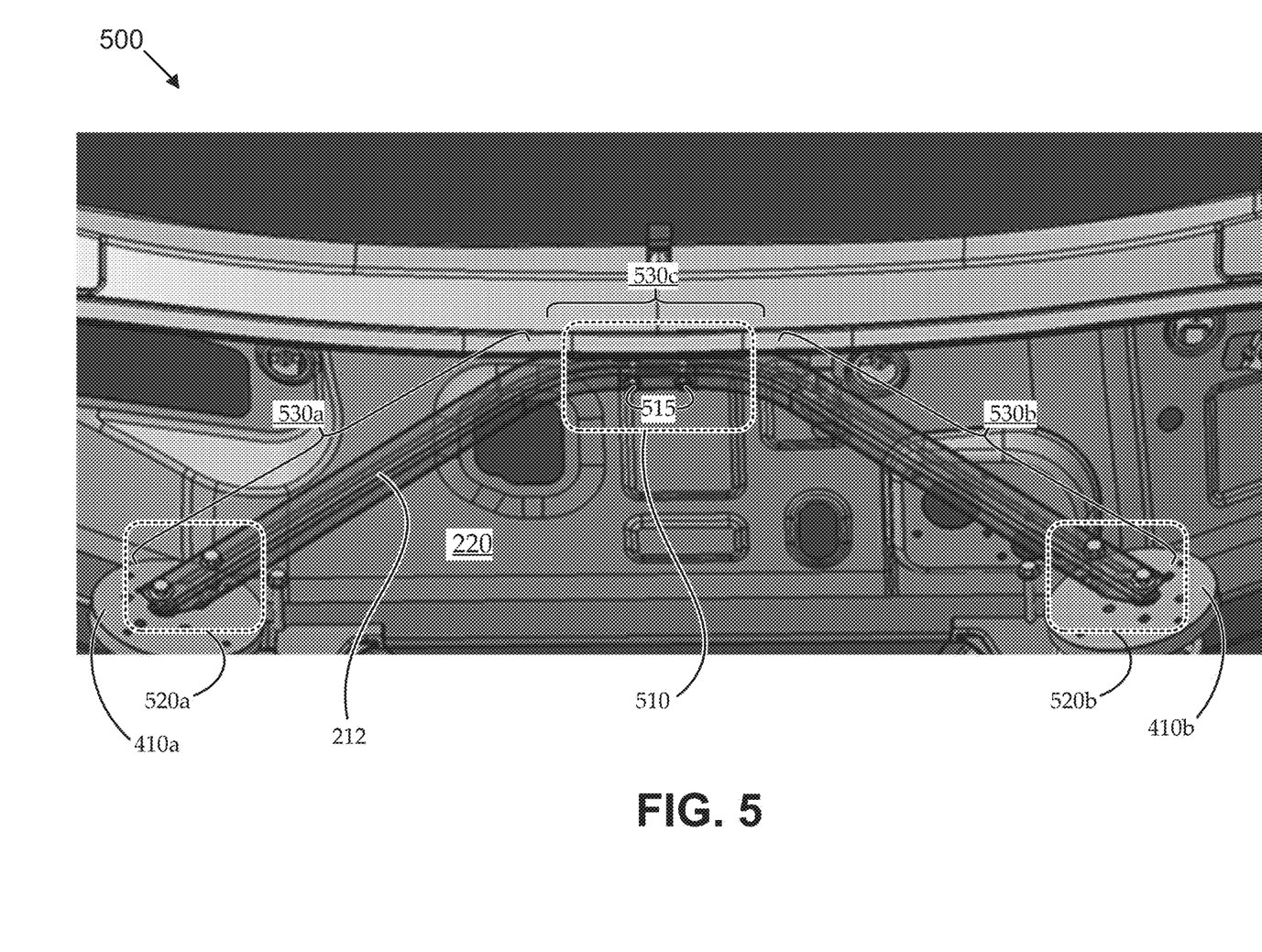
FIG. 5 shows a partial front body structural context that includes a close-up view of an illustrative plenum tie-rail, according to various embodiments.

FIG. 5 shows a partial front body structural context 500 that includes a close-up view of an illustrative plenum tie-rail 212, according to various embodiments. The front body structural context 500 includes a plenum panel 220, a right front suspension assembly 410a, and a left front suspension assembly 410b. The cross-rail 214 is not shown. As illustrated, the plenum tie-rail 212 can include a first portion 530a extending linearly along a first vector between the plenum panel 220 and the right front suspension assembly 410a (e.g., via the right front wheelhouse 230a), and a second portion 530b extending linearly along a second vector between the plenum panel 220 and the left front suspension assembly 410b (e.g., via the left front wheelhouse 230b). The first and second vectors forming an angle. Depending on the geometry of the front body portion of the vehicle body, and/or depending on the locations at which the portions 530 of the plenum tie-rail 212 are coupled with the plenum panel 220, the angle can differ. In one implementation, the angle is substantially ninety degrees. In another implementation, the angle is obtuse.

In some embodiments of the vehicle body, the plenum panel 220 is a large, thin panel, such that it can have an appreciable impact on N/V (noise and vibration), or NVH (noise, vibration, and harshness), performance of the vehicle. Embodiments of the plenum tie-rail 212 can further include a third portion 530c coupled between the first portion 530a and the second portion 530b and extending (e.g., linearly) along an upper ridge of the plenum panel 220. The third portion 530c can be coupled with the plenum panel 220 across a coupling region 510 to add stiffness to the upper portion of the plenum panel 220 and/or to help transfer N/V forces away from the plenum panel 220. In some implementations, multiple attachment structures 515 are used in the coupling region 510. In the illustrated implementation, a first attachment structure 510 couples the plenum tie-rail 212 with an upper portion of the plenum panel 220, a second attachment structure 510 couples the plenum tie-rail 212 with the upper portion of the plenum panel 220. The first and second attachment structures 515 can be disposed on either side of a centerline of the plenum panel 220 that is laterally centered in the front body, for example, between the right and left front wheelhouses 230.

As described herein, the plenum tie-rail 212 can be further coupled with the front suspension assemblies 410. While the figure shows the plenum tie-rail 212 coupled directly to upper mounts of the right front suspension assembly 410a and the left front suspension assembly 410b, embodiments of the plenum tie-rail 212 are typically coupled with the front suspension assemblies 410 indirectly via respective front wheelhouses 230 (not shown). For example, each front wheelhouse 230 can include a suspension coupling region 520 for coupling with the upper mount of a respective front suspension assembly 410, and that suspension coupling region 520 effectively defines the location at which loads are most directly transferred from the respective front suspension assembly 410 to the structure of the front wheelhouse 230. Embodiments of the plenum tie-rail 212 (and/or the cross-rail 214, not shown) can be coupled with each front wheelhouse 230 at the respective suspension coupling regions 520. This can help facilitate transfer of loads among the plenum panel 220 and the front suspension assemblies 410 via the stabilization assembly 210.

Figure 6:
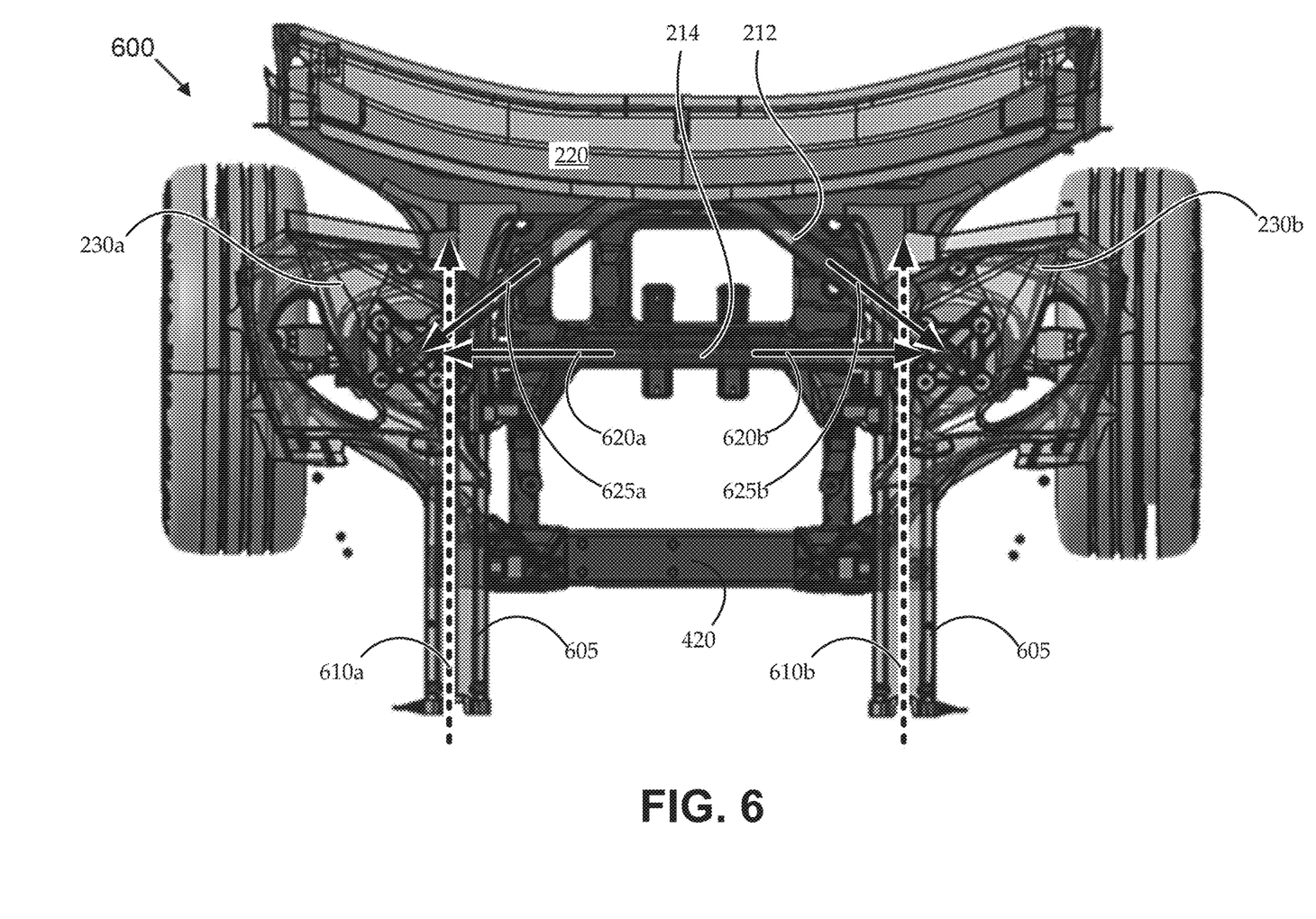
FIG. 6 shows another partial front body structural context to illustrate transfer of certain loads via an illustrative stabilization assembly, according to various embodiments.

FIG. 6 shows another partial front body structural context 600 to illustrate transfer of certain loads via an illustrative stabilization assembly 210, according to various embodiments. The front body structural context 600 includes a plenum panel 220, a plenum tie-rail 212, a cross-rail 214, a right front wheelhouse 230a, a left front wheelhouse 230b, and a front underbody structure 420. The front body structural context 600 also includes right and left front rails 605.

In a front-impact collision, the right and left front rails 605 would experience a large impact force in the direction of dashed arrows 610. The impact force would tend to cause structural deformation of the front rails 605, the front underbody structure 420, and the front wheelhouses 230. Without the stabilization assembly 210, if the impact force were large enough, various structural features and components (e.g., the front wheelhouses 230, front suspension assemblies 410, etc.) would tend to push into (and even past) the plenum panel 220, endangering passengers. The triangular (e.g., triangular, trapezoidal, D-shaped, or the like) shape of the stabilization assembly 210 can provide additional protection for passengers by redirecting some of the impact force. For example, as illustrated by solid arrows 620 and 625, some of the impact force can be redirected outward. This redirection can effectively push the front wheelhouses 230, front suspension assemblies 410, and/or other structures and components outward with respect to the passenger compartment.

Figure 7:
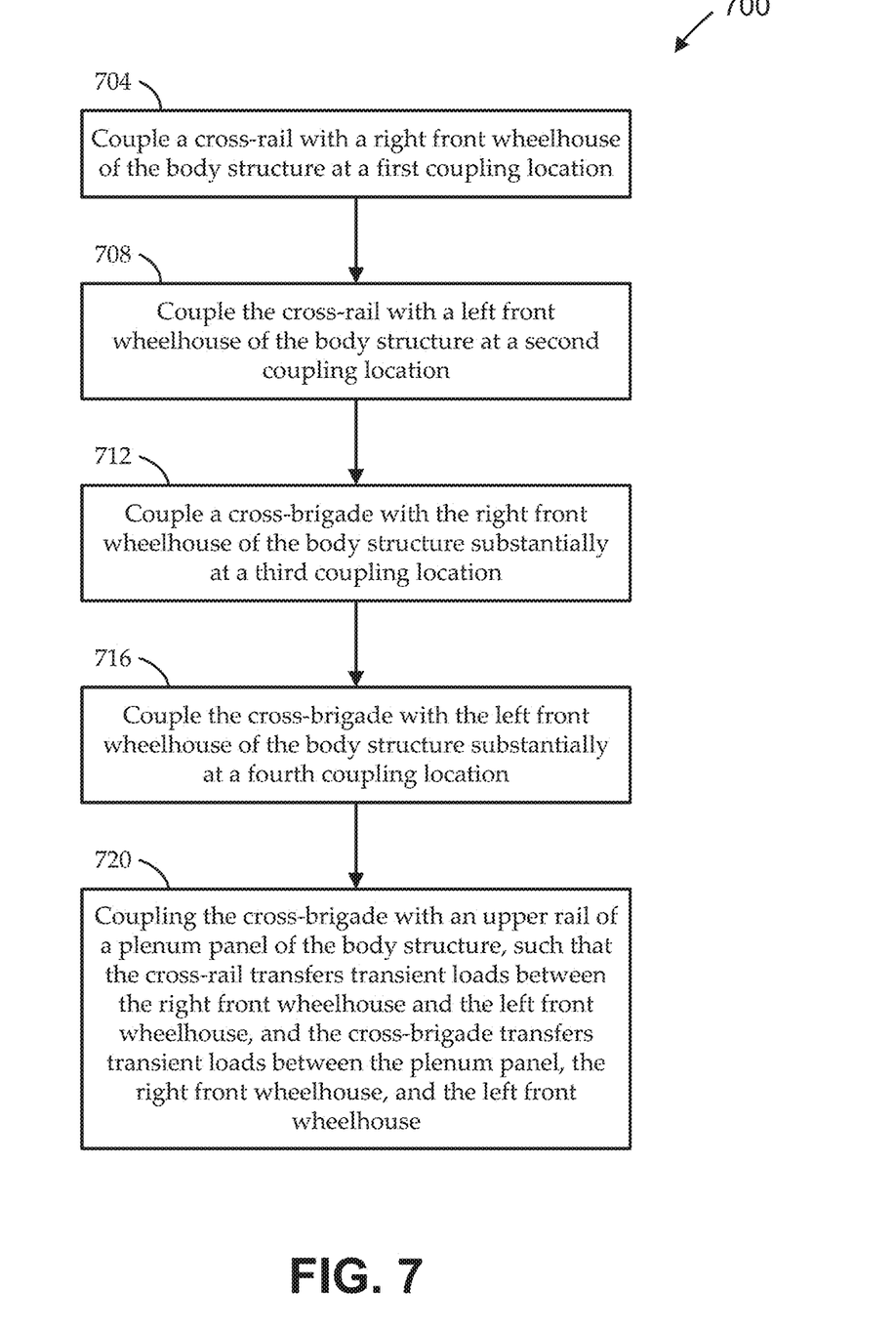
FIG. 7 shows a flow diagram of an illustrative method for stabilization in a vehicle body structure.

FIG. 7 shows a flow diagram of an illustrative method 700 for stabilization in a vehicle body structure. Embodiments of the method 700 begin at stage 704 by coupling a cross-rail with a right front wheelhouse of the body structure at a first coupling location. At stage 708, embodiments couple the cross-rail with a left front wheelhouse of the body structure at a second coupling location. At stage 712, embodiments couple a plenum tie-rail with the right front wheelhouse of the body structure substantially at a third coupling location. At stage 716, embodiments couple the plenum tie-rail with the left front wheelhouse of the body structure substantially at a fourth coupling location. At stage 720, embodiments couple the plenum tie-rail with an upper rail of a plenum panel of the body structure. With such couplings of stages 704-720, the cross-rail can transfer transient loads between the right front wheelhouse and the left front wheelhouse, and the plenum tie-rail can transfer transient loads between the plenum panel, the right front wheelhouse, and the left front wheelhouse. In some implementations, the right front wheelhouse is configured to further couple with a right front suspension assembly substantially at the third coupling location; and the left front wheelhouse is configured to further couple with a left front suspension assembly substantially at the fourth coupling location. In some implementations, the first coupling location is collocated with the third coupling location; and the second coupling location is collocated with the fourth coupling location.

The systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise," "contain," "include," and the like, when used in this specification and in the following claims, are intended to specify the presence of stated features, integers, components, or steps, but they do not preclude the presence or addition of one or more other features, integers, components, steps, acts, or groups.

What is claimed is:

1. A vehicle body having a front portion, a rear portion, and a passenger compartment disposed behind the front portion and in front of the rear portion, the vehicle body comprising:
    a right front wheelhouse coupled with a right front suspension assembly;
    a left front wheelhouse coupled with a left front suspension assembly;
    a plenum panel extending laterally across the front portion, disposed behind the right front wheelhouse and the left front wheelhouse, and disposed in front of the passenger compartment; and
    a stabilization assembly comprising:
    a cross-rail coupled with the right front wheelhouse and the left front wheelhouse to transfer loads between the right front suspension assembly and the left front suspension assembly; and
    a plenum tie-rail coupled with the right front wheelhouse, the left front wheelhouse, and the plenum panel to transfer loads between the plenum panel, the right front wheelhouse, and the left front wheelhouse,
    wherein the cross-rail is formed from a first structural member, and the plenum tie-rail is formed from a second structural member that is separate from the first structural member.

2. The vehicle body of claim 1, wherein:
    the plenum tie-rail comprises a first portion extending linearly along a first vector between the plenum panel and the right front wheelhouse, and a second portion extending linearly along a second vector between the plenum panel and the left front wheelhouse, the first and second vectors forming an angle; and the cross-rail extends linearly from the right front wheelhouse to the left front wheelhouse, such that the plenum tie-rail and the cross-rail form a substantially triangular structure between the plenum panel, the right front wheelhouse, and the left front wheelhouse.

3. The vehicle body of claim 2, wherein:

the first portion and the second portion are formed from a unitary structural member.

4. The vehicle body of claim 2, wherein the plenum tie-rail further comprises a third portion coupled between the first portion and the second portion and extending linearly along an upper ridge of the plenum panel, such that the plenum tie-rail and the cross-rail form a substantially trapezoidal structure between the plenum panel, the right front wheelhouse, and the left front wheelhouse.

5. The vehicle body of claim 1, wherein:

the plenum tie-rail comprises a first portion extending along a first curved path between the plenum panel and the right front wheelhouse, and a second portion extending along a second curved path between the plenum panel and the left front wheelhouse; and the cross-rail extends linearly from the right front wheelhouse to the left front wheelhouse, such that the plenum tie-rail and the cross-rail form a substantially D-shaped structure between the plenum panel, the right front wheelhouse, and the left front wheelhouse.

6. The vehicle body of claim 1, wherein the plenum tie-rail comprises:

a first attachment structure to couple the plenum tie-rail with an upper portion of the plenum panel;

a second attachment structure to couple the plenum tie-rail with the upper portion of the plenum panel, the first and second attachment structures disposed on either side of a centerline of the plenum panel, the centerline being laterally centered between the right front wheelhouse and the left front wheelhouse;

a third attachment structure to couple the plenum tie-rail with the right front wheelhouse; and a fourth attachment structure to couple the plenum tie-rail with the left front wheelhouse.

7. The vehicle body of claim 6, wherein:

the right front wheelhouse is coupled with the right front suspension assembly at a coupling region of the right front wheelhouse;

the left front wheelhouse is coupled with the left front suspension assembly at a coupling region of the left front wheelhouse;

the third attachment structure is to couple the plenum tie-rail with the right front wheelhouse at the coupling region of the right front wheelhouse; and a fourth attachment structure to couple the plenum tie-rail with the left front wheelhouse at the coupling region of the left front wheelhouse.

8. The vehicle body of claim 1, wherein the cross-rail comprises:

a rib extending in a first direction along a central axis of the cross-rail and defining a rib plane;

a first attachment structure extending through the cross-rail along the rib plane in a second direction orthogonal to the first direction, the first attachment structure to couple the cross-rail to the right front wheelhouse.

9. The vehicle body of claim 1, wherein:

the cross-rail is coupled between an upper mount of the right front suspension assembly and an upper mount of the left front suspension assembly to define an upper load path;

the vehicle body further comprises a front underbody structure coupled between a lower mount of the right front suspension assembly and a lower mount of the left front suspension assembly to define a lower load path;

a right strut of the right front suspension assembly is coupled between the upper mount of the right front suspension assembly and the lower mount of the right front suspension assembly to define a right load path; and a left strut of the left front suspension assembly is coupled between the upper mount of the left front suspension assembly and the lower mount of the left front suspension assembly to define a left load path, such that the upper load path and the lower load path form first and second sides of a trapezoid, the first and second sides of the trapezoid being substantially parallel, and the right load path and the left load path form third and fourth sides of the trapezoid.

10. An electric vehicle comprising the vehicle body of claim 1.

11. A stabilization assembly for a body structure of a vehicle, the stabilization assembly comprising:

a cross-rail having:

a first attachment structure to couple with a right front wheelhouse of the body structure;

a second attachment structure to couple with a left front wheelhouse of the body structure; and a first rail member extending between the first attachment structure and the second attachment structure to transfer loads between the right front wheelhouse and the left front wheelhouse; and a plenum tie-rail having:

a third attachment structure to couple with the right front wheelhouse;

a fourth attachment structure to couple with the left front wheelhouse;

a fifth attachment structure to couple with a plenum panel of the body structure; and a second rail member extending between the third attachment structure and the fourth attachment structure, via the fifth attachment structure, to transfer loads between the plenum panel, the right front wheelhouse, and the left front wheelhouse.

12. The stabilization assembly of claim 11, wherein:

the second rail member comprises a first portion extending linearly along a first vector between the plenum panel and the right front wheelhouse, and a second portion extending linearly along a second vector between the plenum panel and the left front wheelhouse, the first and second vectors forming an angle; and the first rail member extends linearly from the right front wheelhouse to the left front wheelhouse, such that the plenum tie-rail and the cross-rail form a substantially triangular structure between the plenum panel, the right front wheelhouse, and the left front wheelhouse.

13. The stabilization assembly of claim 11, wherein the plenum tie-rail further comprises:

the plenum tie-rail further comprises a sixth attachment structure to couple with the plenum panel of the body structure; and the second rail member comprises:
a first portion extending between the third attachment structure and the fifth attachment structure;
a second portion extending between the fifth attachment structure and the sixth attachment structure; and
a third portion extending between the sixth attachment structure and the fourth attachment structure.

14. The stabilization assembly of claim 11, wherein:
the second rail member comprises a first portion extending along a first curved path between the plenum panel and the right front wheelhouse, and a second portion extending along a second curved path between the plenum panel and the left front wheelhouse.

15. The stabilization assembly of claim 11, wherein the cross-rail comprises:
a rib extending in a first direction along a central axis of the first rail member and defining a rib plane; and
the first attachment structure extends through the cross-rail along the rib plane in a second direction orthogonal to the first direction.

16. The stabilization assembly of claim 11, wherein:
the cross-rail is formed from a first structural member; and
the plenum tie-rail is formed from a second structural member that is separate from the first structural member.

17. A method for stabilization in a vehicle body structure, the method comprising:
coupling a cross-rail with a right front wheelhouse of the body structure at a first coupling location;
coupling the cross-rail with a left front wheelhouse of the body structure at a second coupling location;
coupling a plenum tie-rail with the right front wheelhouse of the body structure substantially at a third coupling location;
coupling the plenum tie-rail with the left front wheelhouse of the body structure substantially at a fourth coupling location; and
coupling the plenum tie-rail with an upper rail of a plenum panel of the body structure,
such that the cross-rail transfers transient loads between the right front wheelhouse and the left front wheelhouse, and the plenum tie-rail transfers transient loads between the plenum panel, the right front wheelhouse, and the left front wheelhouse,
wherein the cross-rail is formed from a first structural member, and the plenum tie-rail is formed from a second structural member that is separate from the first structural member.

18. The method of claim 17, wherein:
the right front wheelhouse is configured to further couple with a right front suspension assembly substantially at the third coupling location; and
the left front wheelhouse is configured to further couple with a left front suspension assembly substantially at the fourth coupling location.

19. The method of claim 17, wherein:
the first coupling location is collocated with the third coupling location; and
the second coupling location is collocated with the fourth coupling location.

* * * * *